United States Patent
Bennah et al.

(10) Patent No.: US 9,158,530 B2
(45) Date of Patent: Oct. 13, 2015

(54) ASSIGNING SEVERITY TO A SOFTWARE UPDATE

(71) Applicant: International Business Machines Corporation, Armonk, NY (US)

(72) Inventors: Albert D. Bennah, Cary, NC (US); Adrian X. Rodriguez, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/059,787

(22) Filed: Oct. 22, 2013

(65) Prior Publication Data

US 2015/0113517 A1 Apr. 23, 2015

Related U.S. Application Data

(63) Continuation of application No. 14/057,378, filed on Oct. 18, 2013.

(51) Int. Cl.
- *G06F 9/44* (2006.01)
- *G06F 9/445* (2006.01)
- *G06F 3/12* (2006.01)

(52) U.S. Cl.
CPC ............... *G06F 8/65* (2013.01); *G06F 3/1204* (2013.01); *G06F 3/1207* (2013.01)

(58) Field of Classification Search
CPC ....... G06F 8/65; G06F 3/1204; G06F 3/1207; G06F 3/1214
See application file for complete search history.

(56) References Cited

U.S. PATENT DOCUMENTS

| 6,363,524 | B1 | 3/2002 | Loy | |
|---|---|---|---|---|
| 7,475,293 | B1 | 1/2009 | Little et al. | |
| 7,487,536 | B2 | 2/2009 | Sakurai et al. | |
| 7,921,421 | B2 | 4/2011 | Kawaguchi | |
| 8,060,585 | B2 * | 11/2011 | Waud et al. | 709/221 |
| 8,176,483 | B2 * | 5/2012 | Hoefler et al. | 717/173 |
| 8,255,903 | B2 | 8/2012 | Williams et al. | |
| 8,972,963 | B2 * | 3/2015 | Baset et al. | 717/168 |
| 2002/0184619 | A1 * | 12/2002 | Meyerson | 717/173 |
| 2007/0234331 | A1 * | 10/2007 | Schow et al. | 717/168 |

(Continued)

OTHER PUBLICATIONS

Zhao et al., An empirical study of bugs in build process, Mar. 2014, 3 pages.*
Marks et al., Studying the fix-time for bugs in large open source projects, Sep. 2011, 8 pages.*

(Continued)

*Primary Examiner* — Thuy Dao
(74) *Attorney, Agent, or Firm* — Edward J. Lenart; James R. Nock; Kennedy Lenart Spraggins LLP

(57) ABSTRACT

Assigning severity to a software update, including: receiving, by an update manager, version information for a software application from a computing system, the version information describing a version of the software application installed on the computing system; determining, by the update manager, a severity level of one or more available updates for the software application in dependence upon the version information and update version information; and providing, by the update manager to the computing system, the severity level for each of the one or more available updates.

3 Claims, 4 Drawing Sheets

(56) References Cited

U.S. PATENT DOCUMENTS

| | | |
|---|---|---|
| 2007/0261050 A1 | 11/2007 | Nakano et al. |
| 2009/0204946 A1 | 8/2009 | Fienblit et al. |
| 2010/0251027 A1 | 9/2010 | Yawalkar et al. |
| 2011/0179407 A1* | 7/2011 | Minegishi ............... 717/170 |
| 2011/0314474 A1* | 12/2011 | Ly et al. ............... 718/102 |
| 2013/0019236 A1* | 1/2013 | Nakagawa et al. ......... 717/170 |
| 2013/0254756 A1* | 9/2013 | Kroeselberg et al. ...... 717/171 |
| 2013/0263104 A1* | 10/2013 | Baset et al. ............ 717/168 |
| 2014/0096126 A1 | 4/2014 | Gourley et al. |

OTHER PUBLICATIONS

Meier et al., "How to: Implement Patch Management", Improving Web Application Security: Threats and Countermeasures, Jun. 2003, 9 pages, Microsoft Corporation (online), URL: http://msdn.microsoft.com/en-us/library/ff647981.aspx.

"Belar Advisor Detect 48 Missing XP Updates", computing.net (online) forum, Oct. 2011, 2 pages, URL: http://www.computing.net/answers/security/belarc-advisor-detect-48-missing-xp-updates/37237.html.

\* cited by examiner

ASSIGNING SEVERITY TO A SOFTWARE UPDATE

CROSS-REFERENCE TO RELATED APPLICATION

This application is a continuation application of and claims priority from U.S. patent application Ser. No. 14/057,378, filed on Oct. 18, 2013.

BACKGROUND OF THE INVENTION

1. Field of the Invention

The field of the invention is data processing, or, more specifically, methods, apparatus, and products for assigning severity to a software update.

2. Description of Related Art

Modern computing systems frequently include a wide variety of software applications executing on the computing system. Such software applications evolve over time and updates are frequently released that add functionality to the software application, that correct bugs within the software application, and so on. Installing updates can frequently be time consuming and can expand the amount of system resources utilized by the software application, sometimes with minimal benefits to the user of the computing system.

SUMMARY OF THE INVENTION

Methods, apparatuses, and products for assigning severity to a software update, including: receiving, by an update manager, version information for a software application from a computing system, the version information describing a version of the software application installed on the computing system; determining, by the update manager, a severity level of one or more available updates for the software application in dependence upon the version information and update version information; and providing, by the update manager to the computing system, the severity level for each of the one or more available updates.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
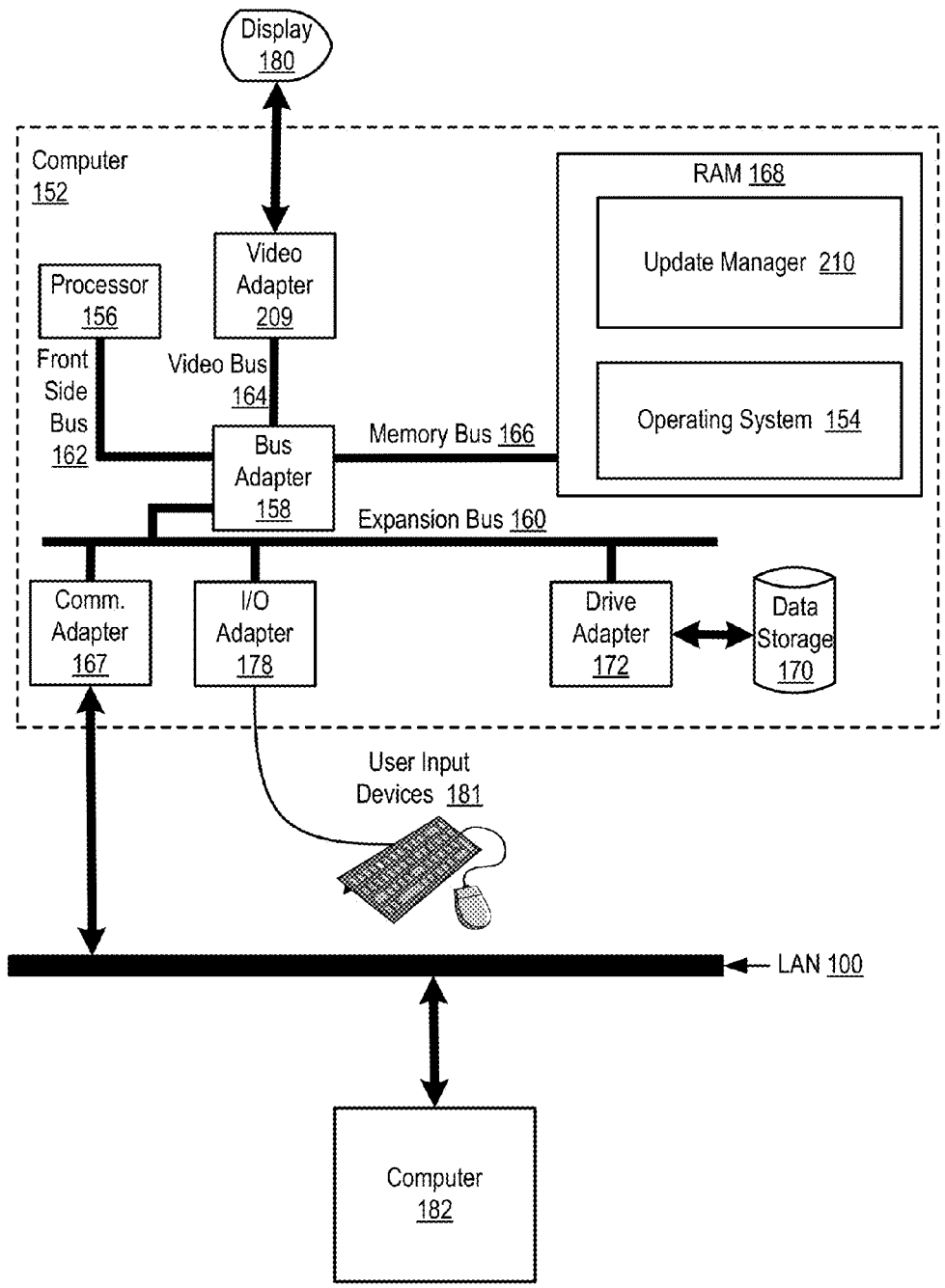
FIG. 1 sets forth a block diagram of automated computing machinery comprising an example computer useful in assigning severity to a software update according to embodiments of the present invention.

Example methods, apparatus, and products for assigning severity to a software update in accordance with the present invention are described with reference to the accompanying drawings, beginning with FIG. 1. FIG. 1 sets forth a block diagram of automated computing machinery comprising an example computer (152) useful in assigning severity to a software update according to embodiments of the present invention. The computer (152) of FIG. 1 includes at least one computer processor (156) or 'CPU' as well as random access memory (168) (RAM') which is connected through a high speed memory bus (166) and bus adapter (158) to processor (156) and to other components of the computer (152).

Stored in RAM (168) is an update manager (210), a module of computer program instructions for assigning severity to a software update according to embodiments of the present invention. The update manager (210) of FIG. 1 may carry out assigning severity to a software update by receiving version information for a software application from a computing system, such as computer (182). The version information describes a version of the software application installed on the computing system. The version information can include, for example, a version number for the software application, a release date for the version of the software application, and so on. The version information may be embodied, for example, as metadata in structured document such as an extensible markup language (AMU) document. The update manager (210) may receive the version information for the software application from the computing system in response to a request for version information from the update manager, by the update manager (210) storing version information each time the software application is updated, and so on.

The update manager (210) of FIG. 1 may further carry out assigning severity to a software update by determining a severity level of one or more available updates for the software application in dependence upon the version information of the currently installed software application and update version information. The update version information may include information describing the version of the corresponding update including, for example, the version number of the update, the release date of the update, information describing the nature of the update including bug fixes, additional features, and so on. In addition, the update version information can include information from the developer of the update specifying the significance or importance of the update. In such a way, determining a severity level of one or more available updates for the software application may be carried out by extracting information from the update information that identifies the significance or importance of the update.

The update manager (210) of FIG. 1 may further carry out assigning severity to a software update by providing, to the computing system, the severity level for each of the one or more available updates. The severity level for each of the one or more available updates may be provided to the computing system via a message that is sent from the update manager (210) to the computing system. In such an example, the severity level may be used by the computing system to determine whether to install one or more of the updates.

Also stored in RAM (168) is an operating system (154). Operating systems useful assigning severity to a software update according to embodiments of the present invention include UNIX™ Linux™ Microsoft XP™ AIX™ IBM's i5/OS™ and others as will occur to those of skill in the art. The operating system (154) and the update manager (210) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for assigning severity to a software update according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

Figure 2:
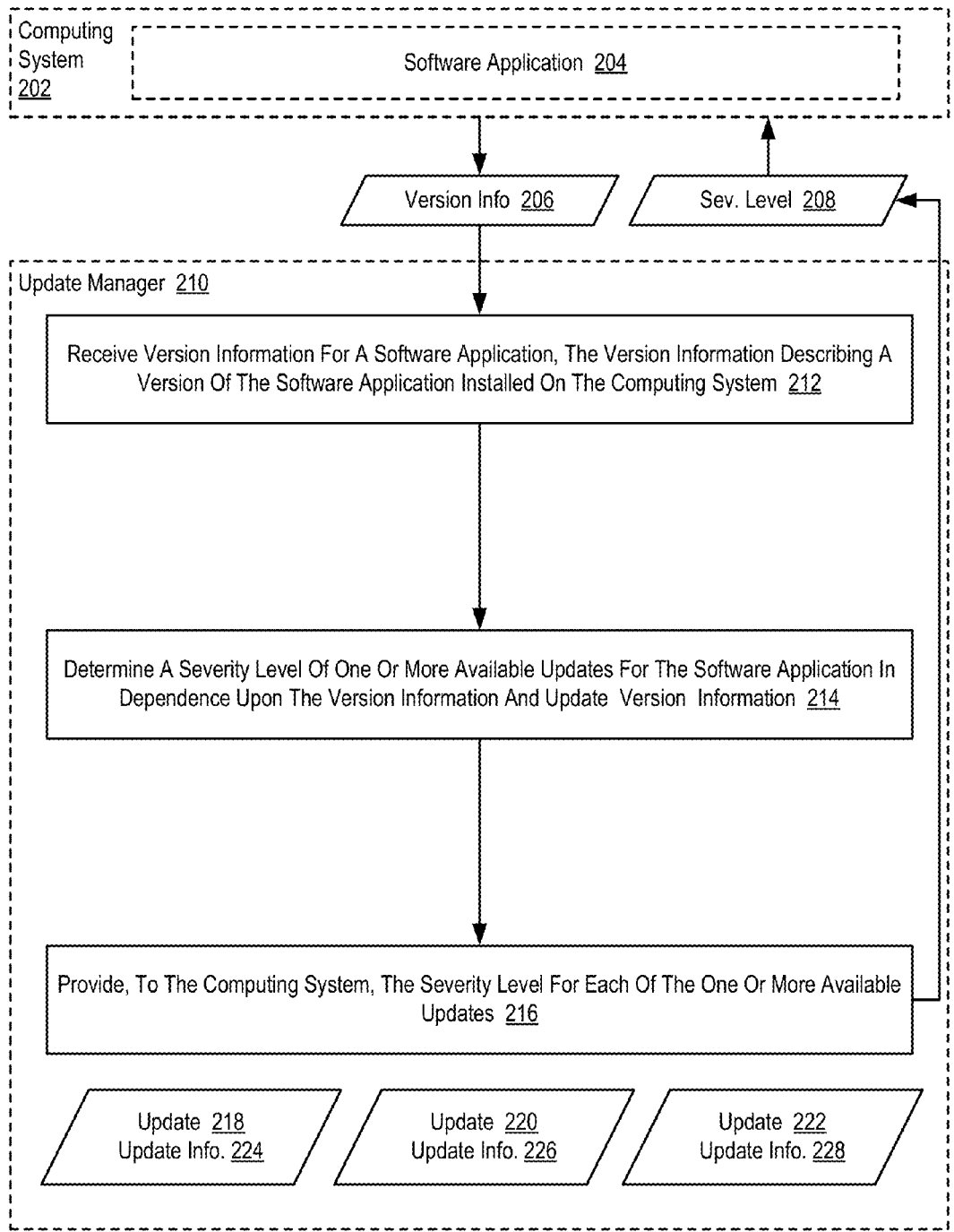
FIG. 2 sets forth a flow chart illustrating an example method for assigning severity to a software update according to embodiments of the present invention.

The example computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for assigning severity to a software update according to embodiments of the present invention include modems for wired dial-up communications, Ethernet (IEEE 802.3) adapters for wired data communications network communications, and 802.11 adapters for wireless data communications network communications. For further explanation, FIG. 2 sets forth a flow chart illustrating an example method for assigning severity to a software update according to embodiments of the present invention. The example method of FIG. 2 is carried out, at least in part, by an update manager (210). In the example method of FIG. 2, the update manager (210) may be embodied as a module of computer program instructions executing on computer hardware such as a computer processor. The update manager (210) of FIG. 2 may reside, for example, on a dedicated server or other computing device that is coupled for data communications to the computing system (202). Alternatively, in other embodiments the update manager (210) may reside on the computing system (202) itself. The computing system (202) of FIG. 2 may be embodied as a laptop computer, desktop computer, tablet computer, blade server in a blade center, and so on.

The example method of FIG. 2 includes receiving (212), by the update manager (210), version information (206) for a software application (204) from a computing system (202). In the example method of FIG. 2, the version information (206) describes a version of the software application (204) installed on the computing system (202). The version information (206) can include, for example, a version number for the software application (204), a release date for the version of the software application (204), and so on. The version information (206) of FIG. 2 may be embodied, for example, as metadata in structured document such as an extensible markup language (AMU) document. In the example method of FIG. 2, the update manager (210) may receive (212) the version information (206) for the software application (204) from the computing system (202) in response to a request for version information (206) from the update manager (210), by the update manager (210) storing version information (206) each time the software application (204) is updated, and so on.

The example method of FIG. 2 also includes determining (214), by the update manager (210), a severity level (208) of one or more available updates (218, 220, 222) for the software application (204) in dependence upon the version information (206) and update version information (224, 226, 228). The update version information (224, 226, 228) of FIG. 2 may include information describing the version of the corresponding update (218, 220, 222) including, for example, the version number of the update (218), the release date of the update (218), information describing the nature of the update including bug fixes, additional features, and so on. In addition, the update version information (224, 226, 228) can include information from the developer of the update specifying the significance or importance of the update. For example, update information (224) for update (218) may indicate that update (218) is of low importance, update information (226) for update (220) may indicate that update (220) is of medium importance, and update information (228) for update (222) may indicate that update (222) is of high importance. In such a way, determining (214) a severity level (208) of one or more available updates (218, 220, 222) for the software application (204) may be carried out by extracting information from the update information (224, 226, 228) that identifies the significance or importance of the update.

The example method of FIG. 2 also includes providing (216), by the update manager (210) to the computing system (202), the severity level (208) for each of the one or more available updates (218, 220, 222). In the example method of FIG. 2, the severity level (208) for each of the one or more available updates (218, 220, 222) may be provided (216) to the computing system (202) via a message that is sent from the update manager (210) to the computing system (202). In such an example, the severity level (208) may be used by the computing system (202) to determine whether to install one or more of the updates (218, 220, 222).

Figure 3:
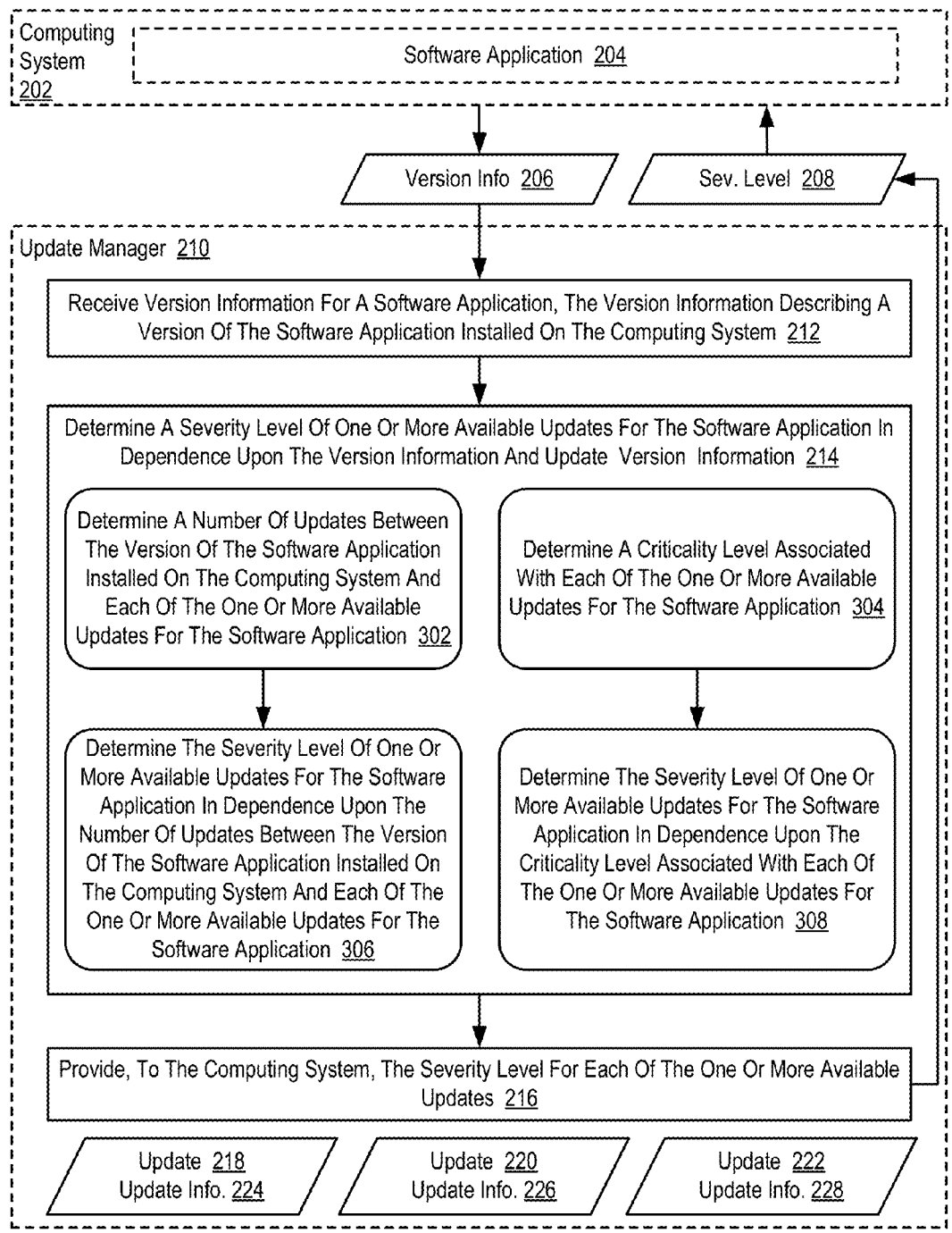
FIG. 3 sets forth a flow chart illustrating an additional example method for assigning severity to a software update according to embodiments of the present invention.

For further explanation, FIG. 3 sets forth a flow chart illustrating an additional example method for assigning severity to a software update according to embodiments of the present invention. The example method of FIG. 3 is similar to the example method of FIG. 2 as it also includes receiving (212) version information (206) for a software application (204) from a computing system (202), determining (214) a severity level (208) of one or more available updates (218, 220, 222) for the software application (204) in dependence upon the version information (206) and update version information (224, 226, 228), and providing (216) the severity level (208) for each of the one or more available updates (218, 220, 222) to the computing system (202).

In the example method of FIG. 3, determining (214) a severity level (208) of one or more available updates (218, 220, 222) for the software application (204) in dependence upon the version information (206) and update version information (224, 226, 228) can include determining (302) a number of updates between the version of the software application (204) installed on the computing system (202) and each of the one or more available updates (218, 220, 222) for the software application (204). In the example method of FIG. 3, updates (218, 220, 222) to the software application (204) may be released by the developer of the software application (204) at predetermined intervals of time, as necessitated to fix bugs within the software application (204), at unpredictable intervals as features are added to the software application (204), and so on. As such, the software application (204) installed on the computing system (202) may not only be out-of-date, the software application (204) installed on the computing system (202) may have multiple update releases that have not been installed. The update manager (210) of FIG. 3 may therefore determine (302) a number of updates between the version of the software application (204) installed on the computing system (202) and each of the one or more available updates (218, 220, 222) for the software application (204), and may use the determined number of updates between the version of the software application (204) installed on the computing system (202) and each of the one or more available updates (218, 220, 222) for the software application (204) as a guide for determining the extent to which the currently installed version of the software application (204) is out-of-date.

In the example method of FIG. 3, determining (214) a severity level (208) of one or more available updates (218, 220, 222) for the software application (204) in dependence upon the version information (206) and update version information (224, 226, 228) can also include determining (306) the severity level (208) of one or more available updates (218, 220, 222) for the software application (204) in dependence upon the number of updates between the version of the software application (204) installed on the computing system (202) and each of the one or more available updates (218, 220, 222) for the software application (204). In the example method of FIG. 3, the update manager (210) may include predetermined thresholds that associate a severity level (208) with the number of uninstalled updates between the version of the software application (204) installed on the computing system (202) and an available update (222). For example, when there are 0 uninstalled updates between the version of the software application (204) installed on the computing system (202) and an available update (222), the update manager (210) may be configured to assign a severity level (208) of 'low' to the update (222), as the software application (204) installed on the computing system (202) is relatively up-to-date compared to update (222). Alternatively, when there are 10 uninstalled updates between the version of the software application (204) installed on the computing system (202) and an available update (222), the update manager (210) may be configured to assign a severity level (208) of 'high' to the update (222), as the software application (204) installed on the computing system (202) is relatively out-of-date compared to update (222), as evidenced by the fact that so many updates have been released between the version of the software application (204) installed on the computing system (202) and update (222). In the example method of FIG. 3, the predetermined thresholds that associate a severity level (208) with the number of uninstalled updates between the version of the software application (204) installed on the computing system (202) and an available update (222) may be created, for example, by a system administrator, by the developer of the software application (204) for inclusion in metadata contained in the initial installation of the software application, and so on.

In the example method of FIG. 3, determining (214) a severity level (208) of one or more available updates (218, 220, 222) for the software application (204) in dependence upon the version information (206) and update version information (224, 226, 228) can alternatively include determining (304) a criticality level associated with each of the one or more available updates (218, 220, 222) for the software application (204). In the example method of FIG. 3, the criticality level associated with each of the one or more available updates (218, 220, 222) for the software application (204) may be set by the developer of the software application (204) and included in the update version information (224, 226, 228). In such a way, the developer may assign higher criticality levels to certain updates (e.g., an update that corrects major security defects in the application) that other updates (e.g., an update that adds a few relatively minor features). In such a way, the update manager (210) can determine how critical it is to install a particular update (218, 220, 222) based on the criticality level associated with each of the one or more available updates (218, 220, 222) for the software application (204).

In the example method of FIG. 3, determining (214) a severity level (208) of one or more available updates (218, 220, 222) for the software application (204) in dependence upon the version information (206) and update version information (224, 226, 228) can also include determining (308) the severity level (208) of one or more available updates (218, 220, 222) for the software application (204) in dependence upon the criticality level associated with each of the one or more available updates (218, 220, 222) for the software application (204). In the example method of FIG. 3, the update manager (210) may include a table or other data structure that associates criticality levels with a severity level (208) of one or more available updates (218, 220, 222). For example, a developer of an application may rate the criticality of a particular update on a scale of 0 to 10, such that a criticality level of 0-3 is associated with a severity level (208) of 'low,' a criticality level of 4-6 is associated with a severity level (208) of 'medium,' and a criticality level of 7-10 is associated with a severity level (208) of 'high.' In such an example, determining (308) the severity level (208) of one or more available updates (218, 220, 222) for the software application (204) in dependence upon the criticality level associated with each of the one or more available updates (218, 220, 222) for the software application (204) may be carried out by performing a lookup operation in such a table.

Readers will appreciate that although the combination of steps 302 and 306 are illustrated as being separate from the combination of steps 304 and 308, embodiments of the present invention may include all of the steps such that determining (214) a severity level (208) of one or more available updates (218, 220, 222) for the software application (204) may take into account both a criticality level associated with an update and the number of uninstalled updates between the currently installed version of the software application (204) and an available update.

Figure 4:
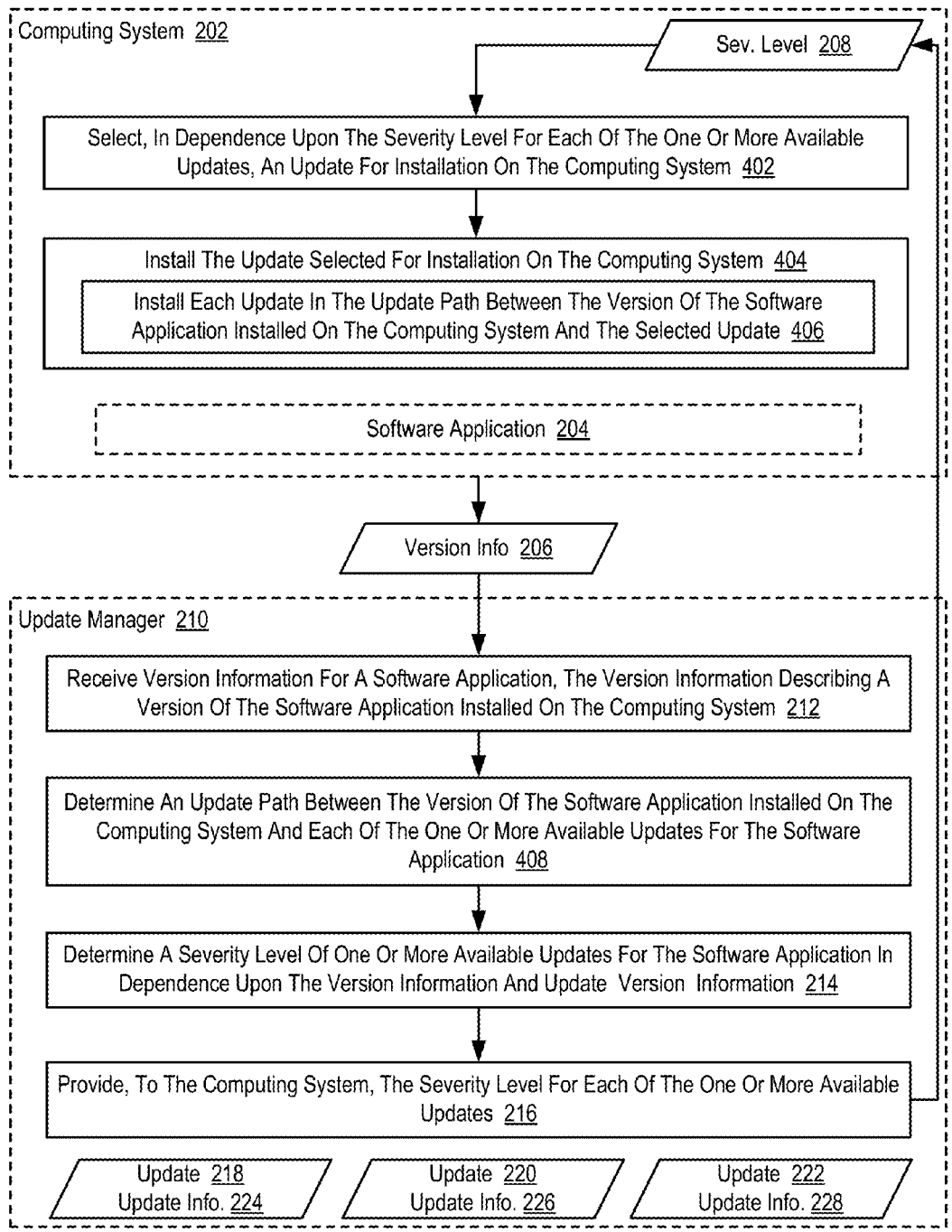
FIG. 4 sets forth a flow chart illustrating an additional example method for assigning severity to a software update according to embodiments of the present invention.

For further explanation, FIG. 4 sets forth a flow chart illustrating an additional example method for assigning severity to a software update according to embodiments of the present invention. The example method of FIG. 4 is similar to the example method of FIG. 2 as it also includes receiving (212) version information (206) for a software application (204) from a computing system (202), determining (214) a severity level (208) of one or more available updates (218, 220, 222) for the software application (204) in dependence upon the version information (206) and update version information (224, 226, 228), and providing (216) the severity level (208) for each of the one or more available updates (218, 220, 222) to the computing system (202).

The example method of FIG. 4 also includes determining (408), by the update manager (210), an update path between the version of the software application (204) installed on the computing system (202) and each of the one or more available updates (218, 220, 222) for the software application (204). In the example method of FIG. 4, a particular update (222) may rely on information or functions delivered in a previous update (218) in order to install correctly. As such, it may not be possible to install a particular update (222) without first installing the previous update (218). In such an example, the update path between the version of the software application (204) installed on the computing system (202) and a particular update (222) for the software application (204) represents the sequence of updates that must first be installed in order to properly install the particular update (222). In such an example, each update (218, 220, 222) may include a list of required updates or versions of the software application that are required in order to successfully install each update (218, 220, 222). Such information can be contained, for example, in the update version information (224, 226, 228) for each update (218, 220, 222). Determining (408) an update path between the version of the software application (204) installed on the computing system (202) and each of the one or more available updates (218, 220, 222) for the software application (204) may therefore be carried out by comparing the update version information (224, 226, 228) for each update (218, 220, 222) to the version information (206) for the currently installed version of the software application (204) to identify updates that have not been installed on the computing system (202).

The example method of FIG. 4 also includes selecting (402), in dependence upon the severity level (208) for each of the one or more available updates (218, 220, 222), an update (222) for installation on the computing system (202). In the example method of FIG. 3, selecting (402) an update (222) for installation on the computing system (202) may be carried out in accordance with a selection algorithm. In such an example, the selection algorithm may be configured to select the update with the highest severity level (208), to select an update with a severity level above a predetermined threshold, to select an update with a severity level above a predetermined threshold that also requires only a predetermined amount of system resources (e.g., memory, network bandwidth, processing cycles) to install, and so on.

The example method of FIG. 4 also includes installing (404) the update (222) selected for installation on the computing system (202). In the example method of FIG. 4, installing (404) the update (222) selected for installation on the computing system (202) may be carried out by launching an update module to write data contained in the update (222) to system memory, update the registration of the software application (204) in an operating system registry, and perform other operations to update the software application (204). In the example method of FIG. 4, installing (404) the update (222) selected for installation on the computing system (202) can further include installing (406) each update (218) in the update path between the version of the software application (204) installed on the computing system (202) and the update (222) selected for installation on the computing system (202), such that all necessary versions and updates of the software application (204) required to install (404) the selected update (222) are in place. Furthermore, the computing system (202) of FIG. 4 may be configured to automatically update based on the severity level (208) of one or more available updates (218, 220, 222) for the software application (204), such that an update is installed (404) automatically once the severity level (208) reaches a predetermined threshold.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A processor-implemented method of assigning severity to a software update, the method comprising:
   receiving, by an update manager, version information for a software application from a computing system, the version information describing a version of the software application installed on the computing system;
   determining, by the update manager, a severity level of one or more available updates for the software application in dependence upon the version information and update version information, including:
      determining a number of updates between the version of the software application installed on the computing system and each of the one or more available updates for the software application; and
      determining the severity level of one or more available updates for the software application in dependence upon a plurality of predetermined thresholds and the number of updates between the version of the software application installed on the computing system and each of the one or more available updates for the software application; and
   providing, by the update manager to the computing system, the severity level for each of the one or more available updates;
   determining, by the update manager, an update path between the version of the software application installed on the computing system and each of the one or more available updates for the software application;
   selecting, in dependence upon the severity level for each of the one or more available updates, an update for installation on the computing system; and
   installing the update selected for installation on the computing system, including installing each update in the update path between the version of the software application installed on the computing system and the update selected for installation on the computing system.

2. The method of claim 1 wherein determining the severity level of one or more available updates for the software application in dependence upon the version information and update version information further comprises:
   determining a criticality level associated with each of the one or more available updates for the software application; and
   determining the severity level of one or more available updates for the software application in dependence upon the criticality level associated with each of the one or more available updates for the software application.

3. The method of claim 1 wherein the computing system is configured to automatically update based on the severity level of one or more available updates for the software application.

* * * * *